(12) United States Patent
Rakhman

(10) Patent No.: US 9,441,099 B2
(45) Date of Patent: Sep. 13, 2016

(54) OLEFINIC THERMOPLASTIC ELASTOMER COMPOSITION AND PROCESS FOR PRODUCING THE SAME

(75) Inventor: Moshe Rakhman, Nesher (IL)

(73) Assignee: Rubber Recycling Technologies Ltd., Haifa Bay (IL)

( * ) Notice: Subject to any disclaimer, the term of this patent is extended or adjusted under 35 U.S.C. 154(b) by 71 days.

(21) Appl. No.: 13/989,889

(22) PCT Filed: Nov. 29, 2011

(86) PCT No.: PCT/IL2011/050034
§ 371 (c)(1),
(2), (4) Date: May 28, 2013

(87) PCT Pub. No.: WO2012/073242
PCT Pub. Date: Jun. 7, 2012

(65) Prior Publication Data
US 2013/0253123 A1    Sep. 26, 2013

(30) Foreign Application Priority Data

Nov. 29, 2010   (IL) .......................................... 209633

(51) Int. Cl.
*C08L 19/00*    (2006.01)
(52) U.S. Cl.
CPC .................................. *C08L 19/003* (2013.01)

(58) Field of Classification Search
CPC ...... C08L 19/003; C08L 23/04; C08L 23/10; C08L 23/0853; C08L 53/02; C08K 5/00
See application file for complete search history.

(56) References Cited

U.S. PATENT DOCUMENTS

| | | | |
|---|---|---|---|
| 5,770,632 A * | 6/1998 | Sekhar et al. ............... 521/41.5 |
| 5,883,139 A * | 3/1999 | Wideman et al. ........... 521/43.5 |
| 6,262,175 B1 | 7/2001 | Jury et al. |
| 6,313,183 B1 * | 11/2001 | Pillai et al. ..................... 521/41 |
| 2007/0112131 A1 * | 5/2007 | Kim ..................... C08L 19/003 525/70 |
| 2007/0135580 A1 | 6/2007 | Tirelli et al. |

* cited by examiner

*Primary Examiner* — Wenwen Cai
(74) *Attorney, Agent, or Firm* — William Dippert; Laurence Greenberg; Werner Stemer

(57) ABSTRACT

An olefinic thermoplastic elastomer composition comprises ground tire rubber (GTR) sub-divided into crumbs; at least one polyolefin; at least one styrene block copolymer; at least one α-olefin-vinyl ester copolymer; at least one sulfur scavenger; at least one blocking agent; at least one disproportioning agent; at least one free-radical donor acceptor; and at least one deflocculant. The product produced from the olefinic thermoplastic elastomer composition comprises a continuous matrix wherein the sub-divided GTR crumbs are homogeneously dispersed within the polyolefin matrix and wherein the sub-divided GTR crumbs have a shell and core structure.

15 Claims, 7 Drawing Sheets

OLEFINIC THERMOPLASTIC ELASTOMER COMPOSITION AND PROCESS FOR PRODUCING THE SAME

CROSS-REFERENCE TO RELATED APPLICATIONS

This patent application is a §371 National Phase filing of co-pending PCT Patent Application No. PCT/IL2011/050034, filed Nov. 29, 2011, which is based upon and claims the benefit of the filing date of Israeli Patent Application No. 209633, filed Nov. 29, 2010, each of which is incorporated herein by reference in its entirety.

FIELD OF THE INVENTION

The present invention relates to a thermoplastic elastomer composition comprising ground tire rubber crumb (GTR) as well as polyolefin, styrene block copolymer, ethylene copolymer with oxygen pendant group, de-linking and re-linking agents and a process of producing the same. Moreover, the present invention relates to a product manufactured from the thermoplastic elastomeric composition.

BACKGROUND OF THE INVENTION

The present invention is intended to address two concerns. The first problem involves the accumulation of used tires in landfills, dumps, and recycling facilities, due to the lack of an adequate market for recycled rubber. Used tires can be burned or pyrolyzed as a means of disposal; however, this alternative is hazardous due to the hazardous gases that can be produced by pyrolysis or burning as well as the basic pollution problems that are incurred with combustion processes in general. Burning of GTR can produce significant pollutants including dioxins.

The second problem arises from the need of cheap soft thermoplastic elastomers that have potential to be recycled by recovery technology as opposed to thermoset rubber.

A thermoplastic elastomer is generally defined as a polymer or blend of polymers that can be processed and recycled in the same way as a conventional thermoplastic material, yet has properties and performance similar to that of vulcanized rubber at service temperatures. For example, U.S. Pat. No. 5,157,082 (Johnson) discloses compositions comprising ground vulcanized rubber, polyolefin and a functionalized olefin polymer. Compositions of this type, however, those compositions tend to have relatively low ultimate elongation and tear strength.

Specifically, U.S. Pat. No. 5,733,943 to Doan discloses a process and composition for the manufacture of a street sign material using reground rubber from used tires in a blend with a styrene-butadiene copolymer and polypropylene or polyethylene mixed in a heated extruder to produce the final product.

In U.S. Pat. No. 6,015,861 to Mertzel et al., a composition comprising finely ground cross-linked rubber with a compatibilizer and thermoplastic material is prepared by a simple mixing technique using an extruder or other form of mixer. Both Doan and Mertzel et al. differ from the present invention in that neither of them uses ground rubber component for devulcanization. In US 20020113333 to Liu et al., a composition provides phase compatibility treatment with reactive blending of the rubber with a free radical generating compound as peroxide and azo.

In US 20070264495 to Resmini, a composition comprising coupling agent having at least one ethylenic unsaturation is used. Coupling agent improves the compatibility between the styrene-based thermoplastic elastomers and the ground vulcanized rubber particles and allows obtaining a thermoplastic elastomer having good mechanical properties, in particular stress at break and elongation at break. Moreover, the Melt Flow Index (MFI) of said thermoplastic elastomer is not negatively affected.

SUMMARY OF THE INVENTION

The present invention relates to improved Olefinic Thermoplastic Elastomer composition that, while having the processability of a thermoplastic polymer, is elastomeric in nature. In this way, the elastomeric composition is recyclable, simpler to manufacture, and of lower cost than known compositions. The composition according to preferred embodiments is accomplished by blending ground tire rubber crumb (GTR) with an alpha olefin copolymer in the presence of styrene block copolymer and α-Olefin-Vinyl ester copolymer. The mixture of thermoplastic phase, de-linking agent, disproportioning agent, compatibilizer and re-linking agent is subject to heat and high shear forces. During such processing, the surfaces of the GTR particles become emulsified, allowing better dispersion and integration into the thermoplastic phase. Additional agents may be added to improve processing and mechanical properties.

Therefore and in accordance with a preferred embodiment of the present invention, there is provided an Olefinic Thermoplastic Elastomer composition comprising:
  ground tire rubber (GTR) sub-divided into crumbs;
  at least one polyolefin;
  at least one α-olefin-vinyl ester copolymer; and
  at least one styrene block copolymer.

Furthermore and in accordance with another preferred embodiment of the present invention, said polyolefin comprises about 5% to about 60% of Crystalline and semi-crystalline polyolefin resin selected from a group comprising of polyethylene copolymer, polypropylene, and mixtures thereof.

Furthermore and in accordance with another preferred embodiment of the present invention, said at least one α-olefin-vinyl ester copolymer is of about 2% to about 30% and is selected from a group comprising of copolymers of acrylate, vinyl acetate and mixtures thereof.

Furthermore and in accordance with another preferred embodiment of the present invention, said at least one styrene block copolymer comprises about 2% to about 30%.

Furthermore and in accordance with another preferred embodiment of the present invention, said Ground tire rubber comprises about 5% to about 70%.

Furthermore and in accordance with another preferred embodiment of the present invention, the composition further comprising about 0.1 to 5% sulfur scavengers such as thiazols, guanidines.

Furthermore and in accordance with another preferred embodiment of the present invention, the composition further comprising about 0.1 to 5% blocking agent such as organic acids, acid donor.

Furthermore and in accordance with another preferred embodiment of the present invention, the composition further comprising about 0.1 to 8% disproportioning agent such as polyatomic alcohols, polyalkene oxides, polyphenols.

Furthermore and in accordance with another preferred embodiment of the present invention, the composition further comprising about 0.3 to 5% free-radical donor-acceptors such as. methylated melamine, polyamines, dithiocarbamates Furthermore and in accordance with another preferred embodiment of the present invention, said at least one α-Olefin-Vinyl ester copolymer comprises vinyl esters of aliphatic carboxylic acids having 4 to 12 carbon atoms and alkyl esters of acrylic or methacrylic acid having 4 to 12 carbon atoms.

Furthermore and in accordance with another preferred embodiment of the present invention, said ground tire rubber is obtained from articles such as scrap tires, retreaded tire buffings, tire tubes or waste rubber articles.

Furthermore and in accordance with another preferred embodiment of the present invention, said crumbs are sized to be up to 1 mm.

Furthermore and in accordance with another preferred embodiment of the present invention, said crumbs are sized to be between 125 and 850 microns.

Furthermore and in accordance with another preferred embodiment of the present invention, said sulfur scavengers is selected from a group of thiazols, sulphenamides in the form 2-mercaptobenzothiazol, N-cyclohexyl-2-benzolhiazole sulphenamide, guanidines in the form of diphenylguanidine and diortotolueneguanidine, and mixtures thereof.

Furthermore and in accordance with another preferred embodiment of the present invention, said blocking agent is selected from a group consisting of organic acids, polyacid and include tall oil, oleic, stearic, adipic, azelaic, maleic, terephthalic, arylsulfonic acid, phthalic anhydride, ammonium polyphosphate and mixtures of these compounds.

Furthermore and in accordance with another preferred embodiment of the present invention, said disproportioning agent is selected from a group consisting of polyatomic alcohols, polyalkylene oxides of the general formula X(R—O)n H and include dimethylene, diethylene, dipropylene, trimethylene, triethylene, butadiene glycols, polyethylene and polypropylene oxides, glycerine, pentaerithritol, resorcinol, catechol; and mixtures thereof.

Furthermore and in accordance with another preferred embodiment of the present invention, said free-radical donor-acceptors can be selected from the group that comprises 1,3,5-Triazine-2,4,6-triamine-formaldehyde polymer, hexamethylenetetramine, hexamethoxymethylmelamine, hexaethoxymethylmelamine, N,N'-ethylene-bismaleimides, reactive polyamide resin based on dimerized fatty acid and polyamines, dithiocarbamates in the form of zinc dimethyldithiocarbamate, zinc diethyldithiocarbamate, zinc dipropyldithiocarbamate, zinc dibutyldithiocarbamate, zinc dibenzyldithiocarbamate, zinc dibutyldithiophosphate, and mixtures thereof.

Furthermore and in accordance with another preferred embodiment of the present invention, the composition further comprising additives selected from additives such as fillers, plasticizers, resins, fresh rubber and rubber mixtures, and compatibilizers.

The product produced from the Olefinic Thermoplastic Elastomer composition of comprising a continuous matrix wherein said sub-divided GTR crumbs are homogeneously dispersed within said matrix and wherein said sub-divided GTR crumbs are having a shell and core topography.

It is further comprising in accordance withyet another embodiment of the present invention, a method of producing an Olefinic Thermoplastic Elastomer composition comprising:

mixing polymers comprising: sub-divided GTR crumbs, at least one polyolefins, at least one α-olefin-vinyl ester copolymer and at least one styrene block copolymer at temperatures above the melting range of said at least one polyolefin and below a decomposition temperature of said sub-divided GTR crumbs;

adding de-linking agents;

adding relinking agents at said temperatures.

Furthermore and in accordance with another preferred embodiment of the present invention, the method further comprising adding sulfur-containing or sulfur-donating substances and/or other polyfunctional compounds selected from a group comprising mercaptobenzimidazol, quinolines.

Furthermore and in accordance with another preferred embodiment of the present invention, the method further comprising adding additives comprising fillers, plasticizers, resins, fresh rubber and rubber mixtures or compatibilizers.

Furthermore and in accordance with another preferred embodiment of the present invention, the method further comprising copolymer ethylene with oxygen-pendant group selected from the group comprising copolymers of acrylate, vinyl acetate, styrene block copolymer and mixtures thereof.

Furthermore and in accordance with another preferred embodiment of the present invention, the method further comprising adding a de-linking sulfur scavenger, blocking and disproportioning agents.

Furthermore and in accordance with another preferred embodiment of the present invention, said temperatures are 150° C. to 250° C.

Additionally, in accordance with yet another preferred embodiment of the present invention, the method is carrying out at pressures of 1 to 30 bar.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments of the present invention only, and are presented in the cause of providing what is believed to be the most useful and readily understood description of the principles and conceptual aspects of embodiments of the invention. In this regard, no attempt is made to show structural details in more detail than is necessary for a fundamental understanding of the embodiments; the description taken with the drawings making apparent to those skilled in the art how the several forms of the invention may be embodied in practice. In the accompanying drawings.

DETAILED DESCRIPTION OF THE INVENTION

Figure 1:
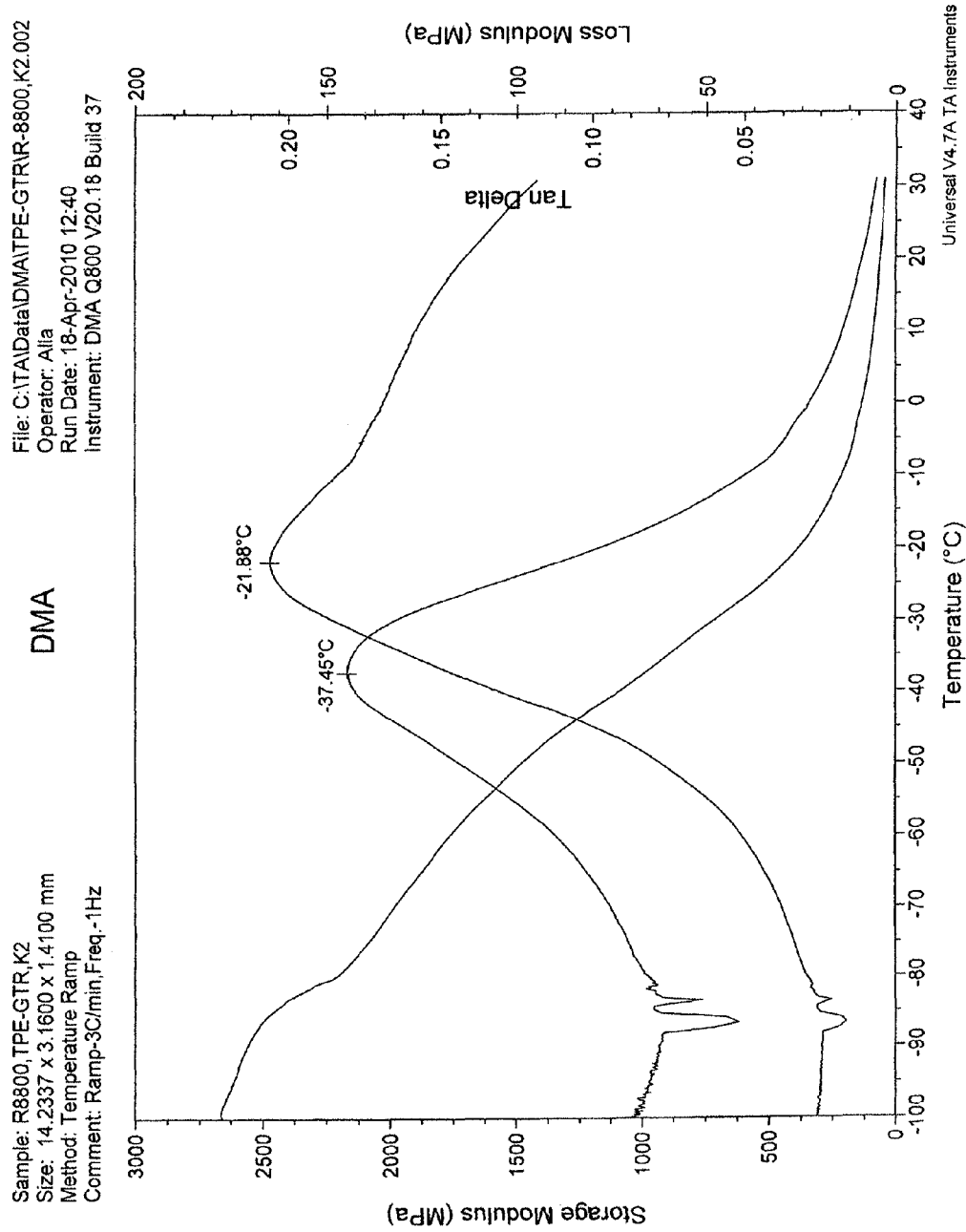
FIG. 1 shows a DMA scan result of a LLDPE-EVA blend used in accordance with a preferred embodiment of the present invention.

In order to better understand the explanation herein below, several definitions are given below:

Vulcanization is defined as a thermo-chemical process that incorporates sulfur and sulfur crosslinks into a mixture of rubber molecules in order to provide elasticity and other properties that are desired in manufactured rubber products.

Devulcanization is defined as a process of cleaving the carbon-sulfur or sulfur-sulfur bonds of the vulcanized rubber. Ideally, devulcanized rubber can be revulcanized with or without the use of other compounds.

Olefinic Thermoplastic Elastomer composition (TPE) or dynamic vulcanizate, is a blend that is prepared by vulcanizing a rubber at elevated temperatures during its admixing with molten plastic in a high shear device. Dynamic vulcanization is distinguished from static vulcanization process that is normally employed in thermoset rubber manufacturing. The term elastomer and rubber are used herein interchangeably. For purposes herein, the term elastomer indicates a polymeric material that exhibits a combination of high elongation or extensibility, high retractability to its original shape or dimensions after removal of the stress or load with little or no plastic deformation as well as material that possesses low modulus and requires a low load to be stretched.

The term thermoplastic resin means a material having thermoplastic processability and has a high modulus and stiffness. Thermoplastic resins do not exhibit a combination of high elongation or extensibility, and are not retractable to their original shape or dimensions particularly when stretched and released beyond their yield point. High loads are required to stretch thermoplastic resins.

Vulcanized rubber in sub-divided form or GTR present a polymer gel formed by 3D-Network of a rubber and carbon gel made from a rubber and carbon black. It is a cluster of hydrocarbon main chains with mono-, di- and polysulfidic crosslinks. The weight average molecular weight of the rubber can be maintained at a high level of over 100,000 and typically over 150,000. In some cases, a weight average molecular weight of over 200,000 can be maintained.

The environmental beneficial and simple processes and compositions described below provide products that can be made from readily available and degradation-resistant scrap rubber. Direct addition of GTR into a matrix of another polymer that is incompatible with GTR generally results in poor mechanical properties of the produced materials. Poor interfacial adhesion between the surfaces of the GTR and the matrix is thought to typically be the main reason for these failures.

A surprisingly simple method has been developed by the Applicants to produce TPEs from GTR (ground tire rubber crumb) that may merely include adding all the required components to a single machine, such as a Banbury or extruder. It is believed that the method described below of producing compositions including material originating from GTR and thermoplastic material, allows retaining the cores of the GTR in their original form, thus the GTR retaining their advantageous mechanical properties, while sufficiently dispersing the GTR within a thermoplastic material. According to the described method, a TPE composition is produced and the material from the GTR endowing the composition with advantageous mechanical properties. The Applicants have noticed that there is an incompatibility between the vulcanized rubber in a subdivided form and the thermoplastic polymers, in particular in the case of polyolefins and its copolymers. Compatibility problems negatively affect the mechanical properties of the obtained thermoplastic elastomer.

Although not being particularly limited, the mixture comprises 5% to about 70% sub-divided rubber; about 5% to about 60% polyolefin; about 2% to about 30% styrene block copolymer; and about 2% to about 30% α-Olefin-Vinyl ester Copolymer.

As such, when the amount of sub-divided rubber exceeds 70 parts by weight, mechanical properties are deteriorated. On the other hand, when the amount thereof is less than 30 parts by weight, the amount of thermoplastic resin is relatively increased such that the material is difficult to be softened and elastic restorability is drastically decreased.

Also, according to the present invention, the Olefinic Thermoplastic Elastomer composition that comprises the sub-divided rubber, the olefin-based thermoplastic resin and the compatibilizer should be reacted through dispersion and mixing in a mixer or extruder having suitable screw configurations so as to exhibit excellent mechanical properties capable of substituting conventional rubber materials.

In addition, the thermoplastic elastomers according to the present invention having rubber properties and thermoplastic properties are molded into a rubber product. After completion of use of such products, it may be recycled several times through a melting process.

According to one aspect, a process of manufacturing Olefinic Thermoplastic Elastomer composition made from GTR involves the following steps:

a) reducing factory scrap rubber or used tires to fine particles or crumb.
b) dynamic de-linking of sub-divided rubber surface
c) dynamic stabilization of de-linked GTR in the polymer matrix
d) dynamic re-linking or re-activation of passivated sulfur.

Accordingly, the chemical formula, combined with the mechanical actions of the mixer that provide the appropriate shear, pressure, dwell time, and temperature, achieves thermoplastic elatomer composition.

The process embodiments may overcome many of the drawbacks of currently known processes. Some embodiments can be performed in a matter of several minutes thereby consuming much less energy and retaining more product physical properties compared with conventional thermo-mechanical processes for the production of TPE.

Very small quantities of non-toxic chemicals may be utilized, with minimal environmental impact and little or no need to recover after treatment.

In some embodiments there is provided a thermoplastic elastomer composition comprising a blend of the following components:

(a) about 5% to about 70% sub-divided rubber;
(b) about 5% to about 60% polyolefin;
(c) about 2% to about 30% styrene block copolymer; and
(d) about 2% to about 30% α-Olefin-Vinyl ester Copolymer and mixtures thereof;

Unless otherwise indicated, all percentages herein are by weight based on the weight of the sub-divided rubber.

Base Polymers

Primarily, the thermoplastic phase dominates the mechanical properties that lead to a rise in Young's moulus, breaking stress and hardness. The base thermoplastic polymer and polymers that are employed are selected to suit the properties required in the final product, and a wide variety of substrates are available. The most preferred substrates are ones that have elastomeric properties to enable the compounding of products having properties comparable to vulcanized rubber such as:

Component A—Crystalline and semi-crystalline polyolefin resin. Particularly advantageously, the ethylene and propylene polymers are used as thermoplastic resin represent a multicomponent mixture of largely isotactic propylene homopolymers and/or of copolymers of propylene and ethylene or .alpha.-olefins having 4 to 18 carbon atoms, non-isotactic propylene homopolymers, and/or propylene copolymers, as well as nonlinear, modified propylene homopolymer or copolymer. If a copolymer is used, it can be random, block or graft, and it can be either isotactic or syndiotactic.

Saturated Ethylene Polymers and Ethylene/alpha-olefin copolymers ("EAOs) are copolymers of ethylene and one or more alpha-olefins, the copolymer having ethylene as the majority mole-percentage content.

Component B—In one preferred form, the α-Olefin-Vinyl ester copolymer comprises polymer chains having pendant oxygen-containing groups.

These polymers are comprised of repeat units that are derived from (a) vinylacetate, (b) butyl acrylate, or optionally a mixture of butyl acrylate and 2-ethylhexyl acrylate. The functionalized polymer is particularly useful for compatibilizing the relatively non-polar copolymers.

Component C—Block copolymers as elastomeric phase consists of at least two polymeric blocks composed mainly of a vinyl aromatic compound and at least one linear block Component D—Ground Tire Rubber crumb (GTR)

Modification of Surface and/or Topography of GTR Crumb

Development of heterogeneous GTR crumb having an outer layer that would be compatible with a wide variety of matrix materials is desirable because discrete particles could likely disperse evenly throughout the matrix material to provide a uniform matrix composition.

A core/shell configuration refers generally to a GTR crumb with at least two defined regions; an internal first region (referred herein as a core); and external second region that substantially surrounds the first region (referred herein as a shell).

The rubber in the outer shell of the sub-divided rubber is de-linked to a high degree and therefore, it is capable of being cured with sulfur. The visco-elastic core, on the other hand, is a cured rubber. Any ratio between the shell and the core is utilized in blends with other polymers. However, for economic reasons, it is desirable to minimize the volume of the de-linked outer shell and maximize the volume of the cured core.

The Applicants have noted that the treatment of particulate materials to modify their surface chemistry and/or topography, can lead to marked improvements in the ability to incorporate the particulate materials into new products, and/or to marked improvements in the properties or performance of such products.

In order to achieve a treatment of particles that can be carried out conveniently in bulk, it is preferable to use methods in which a mass of the particles is exposed to a polyolefin matrix because this facilitates contact. However, any method of the following methods can be employed: surface etching with free radical formation; chemical modification on the surface, e.g. by abstraction and substitution; ablation with exposing fresh surface; wettability by increasing the surface energy of the GTR surface It is preferred in accordance with one aspect of the present invention that the crumb rubber be generally in a range between about 840 microns and about 125 microns. It is even more preferable that the particle size of the crumb rubber will be up to 425 microns and not less than 125 microns. Enlarged surface area of ultrafine particles achieves better product properties. GTR crumb coarser than 425 microns tends to result in molded products that are insufficiently homogeneous and tend to have relatively poor strength properties while crumb that is finer than 125 microns tends to significantly increase the energy costs of the comminuting operation, without significant improving the properties of the compositions. To ensure a consistent particle size for the rubber crumb, the crumb are dry sieved and narrow size cuts were collected for testing.

For the exemplary embodiments, the rubber crumb was derived from dry grinding whole passenger tire with metal and fibers subsequently being removed. Analysis of these selected sub-fractions by ASTM D 5142 indicates that the percentage of rubber was 65.1 wt. % and this was taken to be representative of the amount of reclaimable rubber polymer. Fixed carbon of 28.9 wt. % was taken as corresponding to the amount of carbon black in the crumb. The remaining 6.0 wt. %, ash, was taken as representative of inorganic material.

Dynamic de-linking enhances the ability of the subdivided rubber to be incorporated into the polymer mix. The term "dynamic de-linking" refers to a process in which the cleavage of sulfur links in GTR is accomplished during the mixing (shear, pressure, dwell time, and temperature) in the presence of de-linking agents. According to the method of the present invention, polysulfidic crosslink scission via reaction with polyamines and rubber accelerators is taking place without removing the combined sulfur and substantial degradation of the polymer backbone and therefore is different from de-sulfurization or de-vulcanization processes. Upon de-linking, the dispersion phase consisting of the GTR is dispersed finely in a matrix while the sulfur cross-links are cleaved to generate a large amount of radicals. Formation of main chain radicals and opening of the crosslinks cause the viscosity to be reduced.

In still yet another embodiment, the invention provides a rubber de-linking process comprising the steps of:

(a) thermo-oxidative scission of the sulfur cross-links and main chain backbone in the presence of oxygen (air) or/and iron oxide. Main chain scission causes depolymerization and the formation of low molecular components.

(b) nucleophilic breakdown in the presence of mercaptanes, amines, hydroxides, which are sulfur scavengers that cleave the sulfur bonds;

(c) radical breakdown (blocking of sulfur radicals) in the presence of acids;

(d) disproportioning or preventing of reattachment of sulfur radicals with diols and polyols.

Sulfur scavengers (free-radical donor-acceptors) in the form of thiazols, sulphenamides selectively breaks the sulfur bonds and renders the sulfur passiveness. First, benzothiazol disulfide (MBTS) is split into two 2-mercaptobenzothiazol (MBT) radicals that activate polysulphidic bridges. The sulfur scavenger can be any rubber accelerator capable of initiating a proton exchange reaction, thus promoting the de-linking or opening up of the sulfur network. Similarly, MBT may be replaced on a molar basis by other thiazole accelerators such as zinc 2-mercaptobenzothiazole, or by sulphenamide such as N-morpholinylbenzothiazole-2-sulfenamide, N-cyclohexyl-2-benzolhiazole sulphenamide, or by nitrogen-based accelerators such as guanidines-N,N'-diphenylguanidine (DPG), di-ortho-tolylguanidine (DOTG), and 4,4'-dithiomorpholine, or any other chemicals that may perform the function of rubber accelerator. The zinc oxide can be capable of activating the rubber accelerator so as to initiate the proton exchange reaction, thus promoting the de-linking or opening up of the sulfur network.

Amines with alpha-H atom are effective as de-linking agents. In combination with thiazoles, they provide nucleophilic breakdown of sulfur bonds. Amines also prevent the main chain scission. Methylated melamine and polyamines as free-radical donor-acceptor system include those compounds that are capable of reacting with a sulfur to form a methylene bridge. Free-radical acceptors/donors include hexamethylenetetramine (HMT), hexamethoxymethylmelamine, methoxymethyl)melamaine, N,N'N"-dimethylolmelamine, N-methylolmelamine, N,N'-dimethylolmelamine, N,N'N"-tris(methoxymethyl)melamine. HMMM is a methylated melamine formaldehyde polymer. Useful methylene donors include those commercially available under the tradename CYREZ™ 964 (Cytec). Reactive polyamide resin that has amine values between 230 and 400 those commercially available under the tradename Versamide 140 (Cognis).

The role of acidic substances as blocking agents in the embodiment is to remove MBT from this autocatalytic sequence of reactions, thus delaying those reactions that precede crosslink formation. The sulfur bond is thereby broken but the sulfur is not removed from the GTR. Furthermore, the sulfur is being blocked and capable of reactivating later on. Fatty acid is a proton donor that selectively breaks the sulfur links and blocks the sulfur. Since acid easily donates the hydrogen, the hydrogen interacts with active sulfur atom and prevents the sulfur from reacting with other sulfur atoms. Fatty acid could react with amines to form salts and dissolve sulfur. These salts are surfactants and accelerate cleavage of sulfur bonds. The fatty acid residues or hydrocarbon chains can be any C8-C18 hydrocarbon chain, either saturated or containing 1 to 3 carbon-to-carbon double bonds. Polyacid is selected from a group of acids such as: adipic, aliphatic unsaturated dibasic acids such as maleic, maleic anhydride, benzoic, salycilic, terephthalic acids. In some embodiments, the additive is rosin (a mixture of monocarboxylic acids having a hydrophenanthrene nucleus) such as gum rosin or wood rosin. Rosins are of particular interest because they tend to act as dispersing agents and have a desirable affect on the tackiness of the composition of the invention. Preferably, the rosin is a tall oil rosin (TO), which is a by-product of the paper industry. As stated above, TO contains a relatively large amount of fatty acids (73%) and free rosin acids (23%).

Ammonium polyphosphate and phosphate at mixing temperature are also acid donors. Ammonium polyphosphate is an inorganic salt of polyphosphoric acid and ammonia. The chain length (n) of this polymeric compound is both variable and branched, and can be greater than 1 000. Short and linear chain APPs (n<100) are more water sensitive (hydrolysis) and less thermally stable than longer chain APPs (n>1000). Long chain APP starts to decompose at temperatures above 300° C. to polyphosphoric acid and ammonia. According to the literature, the presence of various acidic compounds and metal oxide enhances the performance of the first degradation pathway by catalyzing the dehydration reactions at temperatures above 150° C.

Disproportioning agent or heterogeneity modifier acts as an inhibitor that prevents reattachment of sulfur radicals. Similarly, the presence of a diol, bisphenols or polyatomic alcohols may aid in the de-linking or the opening up of the vulcanized network of the GTR. Examples of acceptable inhibitors are bisphenols (e.g. resorcinol), diethylene glycols. The amount of alcohol added to the elastomer should be sufficient to substantially de-link the available C—Sn—C bonds.

Re-activation of passivated sulfur and interaction of rubbery domains de-linkes GTR surface is carried out with free-radical-donor group. Suitable types of re-linking agents that may be used in the present invention are amines, disulfides, guanidines, thioureas, thiazoles, thiurams, sulfenamides and dithiocarbamates. Preferably, the primary accelerator is a thiazol or sulfenamide. The secondary accelerator is preferably a guanidine, dithiocarbamate or thiuram compound. Dithiocarbamates are in the form of zinc dimethyldithiocarbamate zinc diethyldithiocarbamate, zinc dibenzyldithiocarbamate (ZBEC), zinc dibutyldithiophosphate, Certain processing aids and cure activators such as stearic acid and zinc oxide (ZnO) may also be used.

Methylated melamine and polyamines can be employed as free-radical donor-acceptor system. In one or more embodiments, free-radical donor-acceptor system includes those compounds that are capable of reacting with a sulfur to form a methylene bridge.

The processability of the present invention can be improved when the total filler grade is reduced. Presence of extender oils from 10 to 100 parts on 100 parts by weight of GTR does not substantially lowers the melt viscosity of the TPE. Optionally, viscosity and flow control agents are added in order to determine the final viscosity. The agents include base and acidified polymers, high structured polyethylenes waxes, epoxy soybean oil, ethylene oxide and/or propylene oxide olygomers. Poor processing rheology in the form of high effective viscosity also hinders transport of the GTR/thermoplastic resin mix within the extruder and through downstream equipment. The thermoplastic phase may contain an acid or base deflocculant, an optional dispersant or surface active agent for the crumb. During mixing, the surfaces of the particles become emulsified and swelled in large colloidal form with a cationic or anionic surface charge, allowing better dispersion and integration into the thermoplastic phase.

The GTR phase should be neutralized of particle charges resulting in completely wetting out the surfaces of the GTR particles. The neutralizing of the charges and surface charges is revealed by the compound arriving at its isoelectric point. Finally, the mixture is neutralized to its isoelectric point, and bonding between the various components is improved. The mixture is processed until it is homogeneous. At this point, additional mixing may change the physical properties significantly. In order to keep reproducibility consistent, the mixing time is very important in order to avoid viscosity shifts. The final product is neutrally charged with a high degree of stability with no sign of the previous mastication.

The deflocculant is preferably a solid resin based material that significantly reduces or increases the zeta potential for large polymeric molecules in the mixtures. They are used to compatibilize different phases in the mixtures. Base defloculants are preferably reactive polyamide resin based on dimerized fatty acid and polyamine that have amine values between 230-400, methylated melamine, polyamines, polyacrylamides. Acidifying deflocculants include carboxylated oxidized polyethylene, copolymers of ethylene with oxygen pendant groups. Surface active agents or processing aids are chosen within a group including the class of fatty acids and their derivatives: esters, salts, amines, amides, and waxes. Mould-release agents that can be used are: saturated or partially unsaturated fatty and oleic acids or their derivatives in the form of fatty acid esters, fatty acid salts, fatty alcohols or fatty acid amides.

The range of effects achievable by the method of the present invention can be expanded by optionally usage of various stabilization systems, plasticizers, reinforcing fillers and other additives. The use of specific tackifiers additionally reduces the unavoidable increase in modulus at the phase boundaries of the two main components of the polymer alloy, namely powdered rubber and specific polymers. Uncontrolled degradation of polyolefin is prevented with free-radical acceptors as thiazoles, quinolines, imidazols. It has been further found by the Applicants that the use of calcium stearate in combination with the imidazole-type inhibitors and dihydroquinolines antioxidants create a stabilizer package that provides a thermoplastic elastomer having outstanding heat stability. The combination of the calcium stearate, imidazole-type inhibitor, and dihydroquinolines antioxidant may be referred to as a stabilizer package. Carbon black also improves the tensile strength, and can improve processability, hysteresis and permanent set.

The method of the present invention comprises a number of steps carried out in conventional processing equipment using heat and high shear forces:
(a) Dynamic de-linking
(b) Dynamic stabilization
(c) Dynamic re-linking Dynamic stabilization is the greatest difficulty in achieving compatibility between the thermoplastic matrix and the dispersed GTR particles. Blend can be technologically compatible if the two polymers are similar in respect to their intermolecular forces or if they interact or react at the phase interface. Polyethylene has a significantly lower surface tension than polypropylene and is far closer to the surface tension of natural or styrene rubber as constituents of the GTR. PE is therefore bonds in a better manner to the GTR. The de-linked sub-divided rubber is dispersed in the polymer matrix by application of high shear deformations and with addition of resins for phase coupling between the GTR and the polyolefin. The styrene block copolymer and EVA were optionally used as dual compatibilizers to improve the interfacial adhesion between de-linked GTR surface and the polyolefin matrix.

The zeta potentials of sub-divided rubber particles are highly pH-dependent and have an isoelectric point at which the potential is zero; the sign of the zeta potential reverses at around this point. However; the zeta potentials of compatibilizing polymer particles are usually negative across the entire pH range. By optionally using polymer with carboxyl groups, it is possible to obtain a more definite negative zeta potential. Olygomer or polymer particles with amino groups have a positive zeta potential in specific pH ranges. Thus, by combining specific polymers/olygomers with the GTR and mixing them in a pH range at which their zeta potentials are of opposite signs, the acid-base interactions between the polymers reduce their interfacial tension that leads to a phase coupling between the GTR and the polyolefin, stabilization of the multiphase blend. The compatibilization scheme comprises functionalizing the olefin-based polymer in such a way that an acid-base interaction is present between the two polymers that may be described as a Lewis acid-base type interaction. Acid-modified polymer (electron acceptor) includes copolymers comprising copolymer ethylene with oxygen-pendant group selected from the group consisting of copolymers of acrylate (EAA), vinyl acetate (EVA) and mixtures thereof. EVA and EAA are considered to provide adhesion to the GTR as a result of affinity with polar sites on the GTR. Base-modified olygomers (electron donor) include methylated melamine formaldehyde resin, hexamethoxymethylmelamine and reactive polyamide resin.

"Dynamic re-linking" means the re-activation of passivated sulfur and interaction of de-linked GTR with free-radical-donor group, where blocked sulfur from outer shell under conditions of shear at a temperature reacts with styrene block copolymer. Dynamic re-linking process is carried out in the presence of free-radical donors which ensure re-activation of passivated sulfur and the cross-linking—two processes that occur simultaneously.

The key to mixing is that the styrene block copolymer and polyolefin are in contact with the sulfur-cured GTR while its surface is being de-linked, and thus has the opportunity to react with sulfur radicals and stabilize it. Subsequently, the accelerator and activator have access to the next sulfur bridge, and the de-linking process is able to continue at a deeper level than just on the surface. Again, the styrene block copolymer and polyolefin stabilize the free sulfur radicals, and the process continues. Thus, the presence of the polyolefin during the surface de-linking process results in a more complete de-linking of the sulfur-cured GTR.

Mixing may be carried out according to techniques known in the art such as, for example, using an internal mixer with tangential rotors (Banbury) or interlocking rotors (Intermix), or in continuous mixers of the Ko-Kneader type (Buss) or co-rotating or counter-rotating twin-screw type. The combination of surface and in-depth treatment is better than surface treatment only, because the combination provides stronger physical and chemical actions on the crumb.

A composition of the present invention may be manufactured in a single operation or in a number of operational steps. The mixing process is separated into two basic processing functions, dispersive mixing and distributive mixing.

Mixing process is carried out at a window of temperature which is above the melting point range of the polyolefin but below the decomposition temperature range of the GTR.

The thermoplastic elastomer of the present invention may be prepared by mixing the GTR, the polyolefin, the styrene block copolymer and the ethylene copolymer containing oxygen-pendant groups. The deflocullant, antioxidant, fillers, flow control agents, and tackifiers are melted or fluxed and distributed homogeneously within the mixture.

In this connection, the chemicals are transformed into the active state in which the sulfur chains are cleaved. A temperature below 150 C may cause an insufficient cutting of the links, resulting in an incomplete de-linking of a GTR surface. At temperature above 200 C, cutting of the main chain precedes the cutting of the sulfur links. Some types of rubbers undergo depolymerization and the formation of low molecular components. Other types can undergo hardening due to inter- or intra-molecule reaction of the rubber. Both reactions may cause the deterioration of the mechanical properties and therefore are avoided.

The temperature that increases continuously during processing is generated by the friction of the particles. The mixture is cooled to its starting temperature when the process is completed; an external heat supply is preferably not required or controlled according to the working volume. In order to perform chemically stable process, a temperature in the range of 150-190° C. is required. The material should pass through this active temperature range preferably in 60 to 240 seconds. The batch is then removed from the mixer, pelletized and cooled. If an extruder is used, the process is being carried out in the first 50 to 75% of the processing time frame.

The mixture was heated to a temperature sufficient to melt the thermoplastic components, at residence times of 0.5 to 5 minutes, followed by granulation and subsequently by melt compounding of mixtures of GTR, resins in the presence of de-linking and re-linking agents.

In accordance with the method of this invention, the process temperature generally ranges above the crystalline melting point of the base polymer and the degradation temperature of polymer. The re-linking conditions can vary, but the melt temperatures are typically between 110 and 250° C., depending upon residence time and the strength of free-radical acceptor. Mechanical shear is required to expose crumb surfaces to de-linking agents in order to break the multiple sulfur cross-links on the GTR surface. The composition is constantly and intensively worked with temperatures between about 150 C and 200 C, providing a pass through time of just one or two minutes. It is important to note that the purpose of the extruder is to provide a continuous process, controlled environment, rather than through batch processing.

Converting the Olefinic Thermoplastic Elastomer composition into a shaped article is preferably a molding process selected from the group consisting of injection molding, blow molding, injection blow molding, extrusion blow molding, co-injection molding, co-extrusion molding, a combination of sheet or film extrusion followed by thermoforming, compression molding, and parison molding, vacuum molding, rotational or slush molding, transfer molding, lay-up or contact molding, a combination of sheet or film extrusion followed by thermoforming, calendering, casting, extrusion, stamping, or combinations of these methods. Overmolding of the Olefinic Thermoplastic Elastomer composition can be achieved by a two shot or multi-component injection molding process or co-injection molding process. The overmolding can also be accomplished by insert injection molding carried out in two steps: In the first step, the thermoplastic substrate is molded and is subsequently inserted in another cavity for overmolding in the second step, turning into the thermoplastic elastomer. The Olefinic Thermoplastic Elastomer composition can be overmolded on a rigid metal substrate by insert injection molding processes.

Tests Employed in Examples

In order to estimate the lowest temperature for thermal cracking of the polymer components in the crumb, temperature programmed gravimetric analysis (TGA) was conducted on the rubber crumb. The TGA showed that significant mass loss does not occur until the temperature is above 200° C. and the major mass loss occurs above 300° C. First and second derivative analyses of the data indicated that the maximum changes in mass occur at 275° C. and 386° C. The lower temperature peak mass loss can correspond to loss of low molar mass additives as well as to facile cracking of the rubber polymer and additives. The higher temperature peak in mass loss corresponds to cracking of the rubber polymer backbone. Thermal cracking reactions involving the production of gas and a decrease in crumb mass constitute reactions that degrade the rubber polymer by shortening the polymer chain length or otherwise altering the chemical structure, and are undesirable. Temperature was continuously increased during the TGA analysis and thermal reactions also may have occurred at lower temperature but relatively slow so that they were not observable within the accuracy of the measurement. In view of the forgoing, it is preferred that the devulcanization reaction in accordance with the invention be restricted to a maximum temperature in the order of 250° C. and reaction times should be as short as possible (typically less than 10 minutes).

Stress-strain properties were determined on a Lloyd model LD 10K. Tensile break, elongation at break, and 100 percent modulus were measured in accordance with ASTM D-412. Melt index is measured in accordance with ASTM D-1238. Shore A hardness tests were performed using a hand-held tester, following the procedures outlined in ASTM D2240. The durometer is depressed into the sample during 5 sec until the needle stops. Compression set (ASTM D 395) was measured under constant strain of 25 percent, at 70° C. for 22 h., Method "B". The sample plaques were cut into disks of 25 mm diameter. The disks were stacked up to a thickness of 12.5 mm. Abrasion resistance (DIN 51560) was measured under 1 kg load.

Dynamic Mechanical Analysis (DMA) was accomplished in forced dynamic shear using a rectangular torsion specimen. Temperature sweeps were performed over the range from −100° C. to 50° C. with heating rate of 3° C./min.

The upper service temperature (UST) was determined using a Perkin Elmer model DSC and heating rate of 5° C./min was used. Test specimen was prepared by melting pressing at 190° C. and air-cooling to room temperature.

Inkability. The new compound has also increased the "inkability" of the rubber compounds. Increased "inkability" means that the compound picks up ink and other polar materials with greater efficiency.

EXAMPLES

This invention is illustrated by the following examples that are merely for the purpose of illustration and are not to be regarded as limiting the scope of the invention or the manner in which it can be practiced.

All percentages or parts by weight herein are by weight based on the weight of the rubber crumb.

TABLE 1

Materials Used

| Trade name | | Producer | Abbr. |
|---|---|---|---|
| Ground Rubber Tire Crumb | | Tyrec | GTR |
| Escorene LL 1001 | Polyethylene | ExxonMobil | LLDPE-1 |
| Tafmer 0201 | | Mitsui | LLDPE-2 |
| Escorene Ultra UL 00119 | Copolymer ethylene and vinylacetate 19% | ExxonMobil | EVA-1 |
| Escorene Ultra UL 00328 | Copo ethylene and vinylacetate 28% | ExxonMobil | EVA-2 |
| Levamelt 400 | Copo ethylene and vinylacetate 40% | Lanxess | EVA-3 |

TABLE 1-continued

| Materials Used | | |
|---|---|---|
| Trade name | | Producer | Abbr. |
| Capilene Q 73 | Polypropylene | Carmel Olefins | PP |
| Europrene SOL T 161 | Styrene copolymer 30% styrene | Polimeri | SBS |
| Ufacid K | Dodecylbenzenesulfonic acid | Ufacid K | DBSA |
| Perkacit MBT | 2-Mercaptobenzothiazol | Flexsys | MBT |
| Vulcacit DOTG | Diorthotolylguanidine | Flexsys | DOTG |
| Perkacit ZBEC | Zinc Dibenzyldithiocarbamate | Lanxess | ZBEC |
| Cohedur H30 | Hexamethylene tetramine | Lanxess | HMT |
| Cohedur A | Methylolmelamine | Lanxess | HMMA |
| Cyrez 964 | 1,3,5-Triazine-2,4,6-triamine-formaldehyde polymer | Cytec | HMMM |
| Cohedur RK | Resorcinol | Laxness | |
| Versamide 140 | Polyamide-polyamine | Shell | PAPA |
| Tall oil | Tall oil | Arizona | |
| Ammonium polyphosphate Phase 1 | Exolite 422 | Clariant | APP |

Example 1

To ensure a consistent particle size for the rubber crumb used in these tests, the crumb was dry sieved and narrow size cuts were collected for testing. A batch of rubber crumb with a nominal particle size of 250 to 840 microns (60 to 20 mesh) was obtained from a local supplier. The results of dry screening of the crumb are summarized in Table 2.

The sub-fractions selected for use in testing consisted of crumb having particle sizes between 425 and 590 microns.

TABLE 2

| Characteristics of GTR | | | | |
|---|---|---|---|---|
| Properties | ASTM Test methods | Unit | ASTM D 5603 Value | Fact Value |
| Heating | | | | |
| Loss at 105° C. | D 1509 | % | | 0.1 |
| Ash content at 550° C. | D 297, 5667 | % | <8 | 7 |
| Contents | | | | |
| Rubber hydrocarbon | D 297 | % | >42 | 46 |
| Carbon black | D 297 | % | 26-38 | 29 |
| Free metal | | % | <0.1 | no |
| Extracts | | | | |
| Acetone extract | D 297 | % | 8 = 22 | 12 |
| Sieve analysis | ASTM | mesh | | |
| Residue on 0.840 mm | D 5644 | 20 | | 0 |
| Residue on 0.590 mm | | 30 | | 14 |
| Residue on 0.425 mm | | 40 | | 58 |
| Residue on 0.250 mm | | 60 | | 26.5 |

Fixed carbon of 29 wt. % was taken as corresponding to the amount of carbon black in the crumb. The remaining 7.0 wt. %, ash, was taken as representative of inorganic material.

Example 2

The compositions are summarized in Tables 1 through 7, with amounts listed as parts by weight. GTR (40 mesh; available from Tyrec) was blended with LLDPE-1, EVA-1, SBS at a GTR:LLDPE:EVA:SBS wt. % of 200:60:20:20. These polymers were added to a Brabender Plasticorder after an equilibrium temperature (180° C.) and a 50 rpm rotor was reached.

After the blend was fully melted, as indicated by a stabilized torque reading, which was usually obtained in one to two minutes, sulfur scavenger, blocking, disproportioning, re-linking agents, filler, oil, antioxidant were added and blending continued for approximately an additional minute.

As soon as the temperature reached 190° C., a degassing step of 1-2 minutes was carried out. The composition was removed and ground using a laboratory mill. After blending, to demonstrate that the compositions were melt processable, each batch was placed in a picture frame mold at ambient temperature and compression molded into sheet of 2.0 mm thick in a hydraulic press, both platens of which had been preheated to 190° C. The press was heated for an additional 5 minutes. The molded sheet was then rapidly cooled under pressure to ambient temperature and removed from the press. Test specimens were die cut from the molded sheet and used after 24 hours storage at room temperature. The molded sheet samples were re-melt processible.

Blend compositions were prepared containing the ingredients depicted in Table 3. Batch A is a control batch containing unmodified polyethylene. Batch D illustrates an improved composition of the invention. The data shows that the incorporation of olefin copolymers and styrene copolymers results in substantial decrease in modulus and therefore more elasticity of the material.

In order to illustrate the combined effect of the vinylpolymer (ethylenevinyl acetate copolymer) and uncured rubber (styrene-butadiene-styrene block copolymer) on the compositions of the present invention, four compositions A, B, C and D were mixed, blended, molded and tested as described above. The compositions, and the tensile strength, elongation, tear strength, hardness values are given together with the particulars of the compositions, in Table 3 below.

TABLE 3

| Influence of polymer type on properties | | | | | |
|---|---|---|---|---|---|
| | A | B | C | D | E |
| LLDPE-1 | 100 | 60 | 60 | 60 | 60 |
| EVA-1 | | 40 | 20 | 20 | 20 |
| SBS | | | 20 | 20 | 20 |
| GTR | | | | 100 | 100 |
| Naphtenic oil | | | | | 20 |
| Modulus 100%, MPa | 9.5 | 7.4 | 6.5 | 4 | 2.4 |
| Modulus 200%, MPa | 9.8 | 7.8 | 7 | 5.9 | |
| Tensile, MPa | 24.2 | 26.7 | 16.2 | 5.8 | 2.4 |
| Elongation, % | 661 | 729 | 648 | 202 | 111 |
| Inkability | not | low | med | good | good |

The synergistic effect of the combination of the vinyl polymer and uncured rubber on the elongation and tear strength is particularly marked.

TABLE 3 shows a summary of ink analysis of the compounds. Sample A is a control compound with no inventive compound and polyethylene based. Sample B is the same as Sample A with an addition of 40% EVA. A comparison of Sample B to Sample A shows a three-fold increase in inkability of the compound. Sample C is the same as sample A with 20% EVA and 20% of SBS added. Improved inkability is also shown in Sample C.

In increasing the "inkability" of thermoplastic elastomers, the composition of the present invention increases the polarity, which enables it to pick up ink or other polar materials. The inventive compound creates compatibility between the plastic and the GTR, while using a non-toxic substance.

Evidence that LLDPE and EVA materials continue to exist as separate phases within the blend can be seen in FIG. 1. This figure presents DMA results for 60/40 wt. % blend. Two dispersion peaks are clearly apparent in both the G" (shear loss modulus) and tan δ data. Similarly, the other peak in G" occurs near −37 C (Tg of the EVA).

Figure 2:
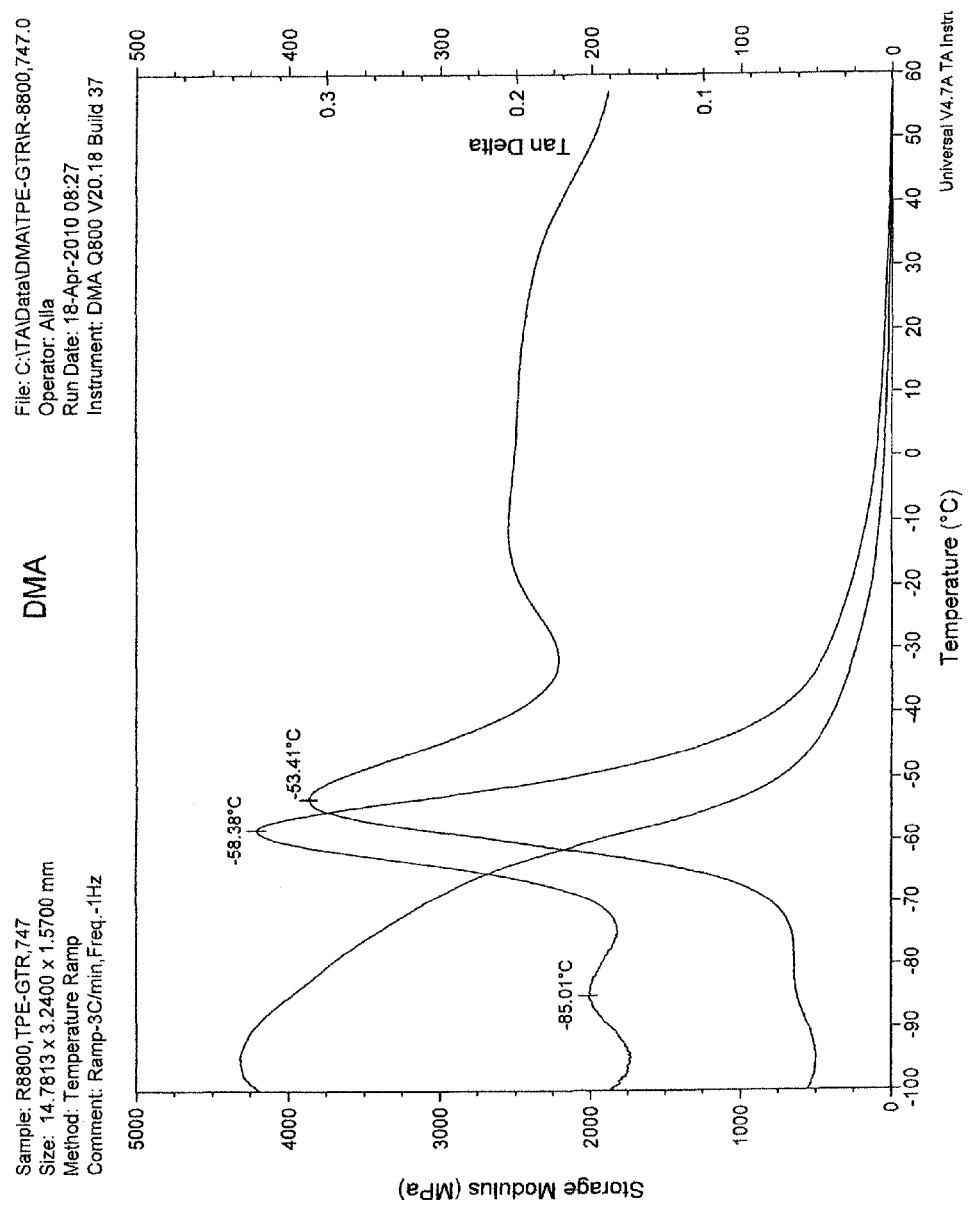
FIG. 2 shows a DMA scan result of a GTR-LLDPE-EVA-SBS blend used in accordance with a preferred embodiment of the present invention.

The low temperature dispersion peak shown in FIG. 2 for G" occurs at −60° C. in LLDPE-EVA-GTR composition, closely approximating the glass transition temperature (Tg) of the pure styrene butadiene rubber (base of GTR). One dispersion peak at −60° C. implies that relatively good compatibility of polymers is achieved during mixing.

Figure 3:
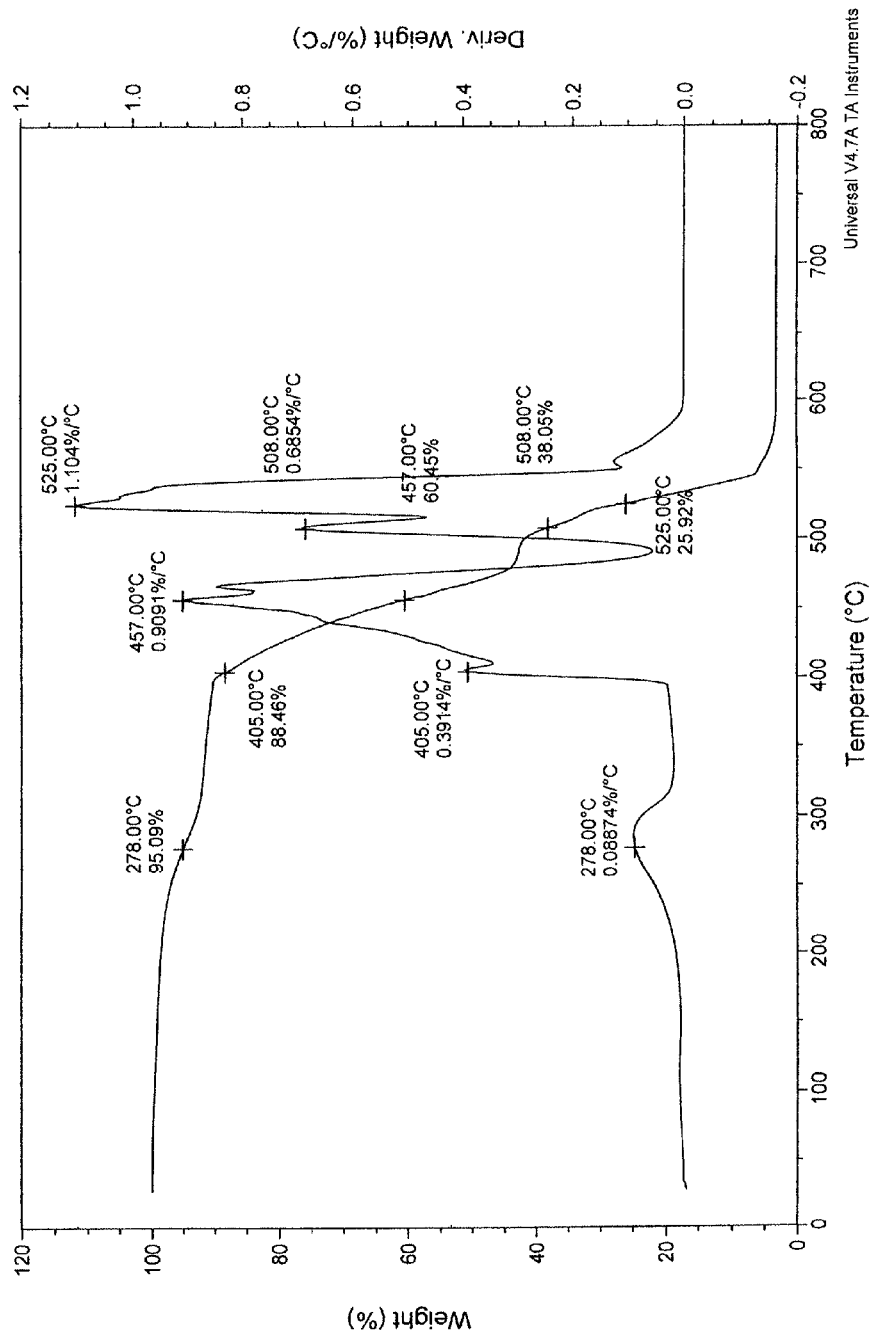
FIG. 3 shows a TGA scan result of a GTR crumb used in accordance with a preferred embodiment of the present invention.

In order to estimate the lowest temperature for thermal cracking of the polymer components in the crumb, temperature programmed gravimetric analysis (TGA) was conducted on the rubber crumb and is shown in FIG. 3.

Figure 4:
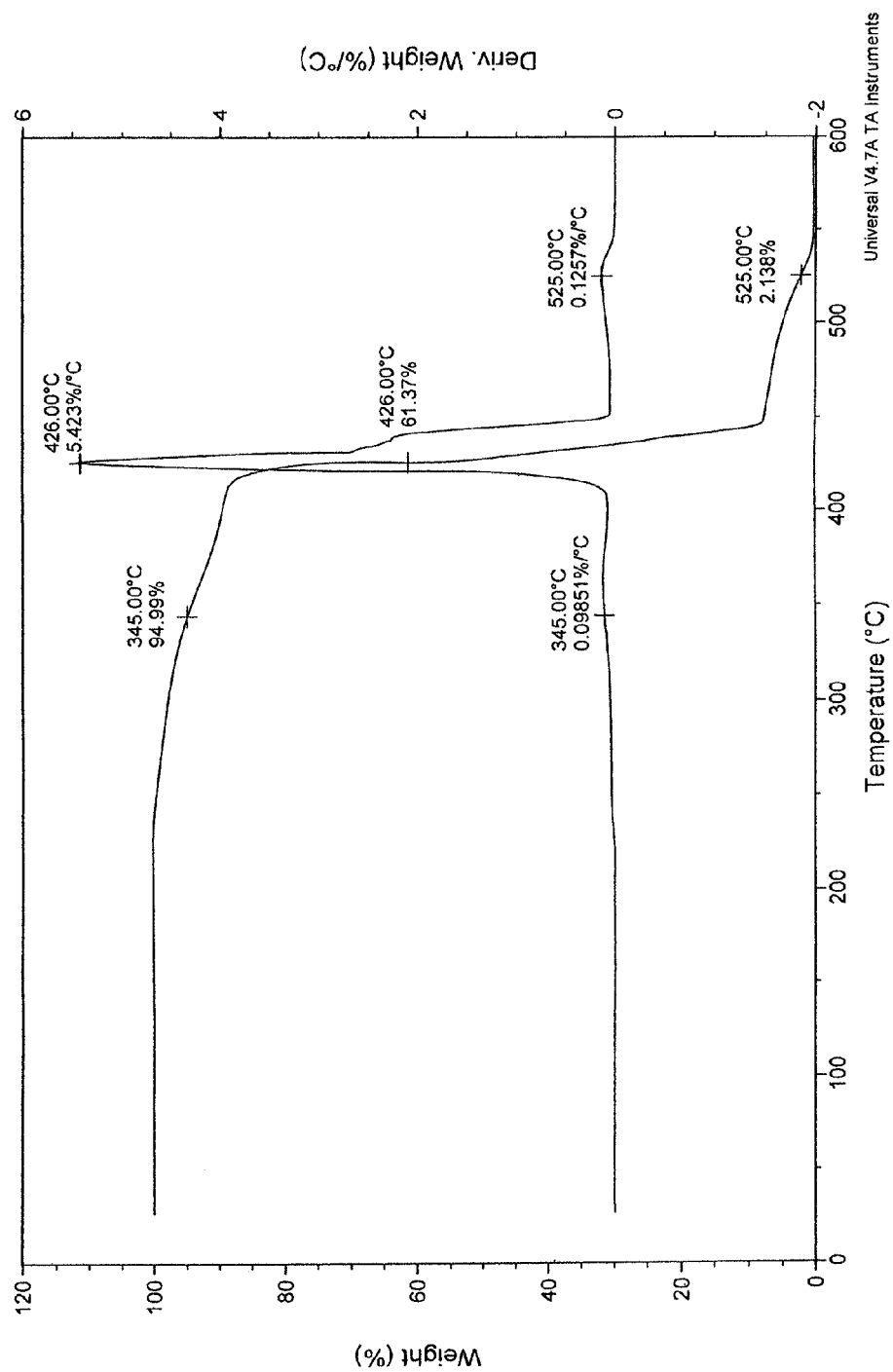
FIG. 4 shows a TGA scan result of a LLDPE-EVA-SBS blend used in accordance with a preferred embodiment of the present invention.

The TGA showed that significant mass loss at GTR crumb does not occur until the temperature is above 200° C. and the major mass loss (5%) occurs above 278° C. First and second derivative analyses of the data indicated that the maximum changes in mass occur at 405° C., 457° C. and 525° C. TPE-GTR mass loss started above 310° C. TGA of composition C (polymers only without GTR) as shown in FIG. 4 indicates the initiation of decomposition at 345° C. and maximum changes at 426° C.

Figure 5:
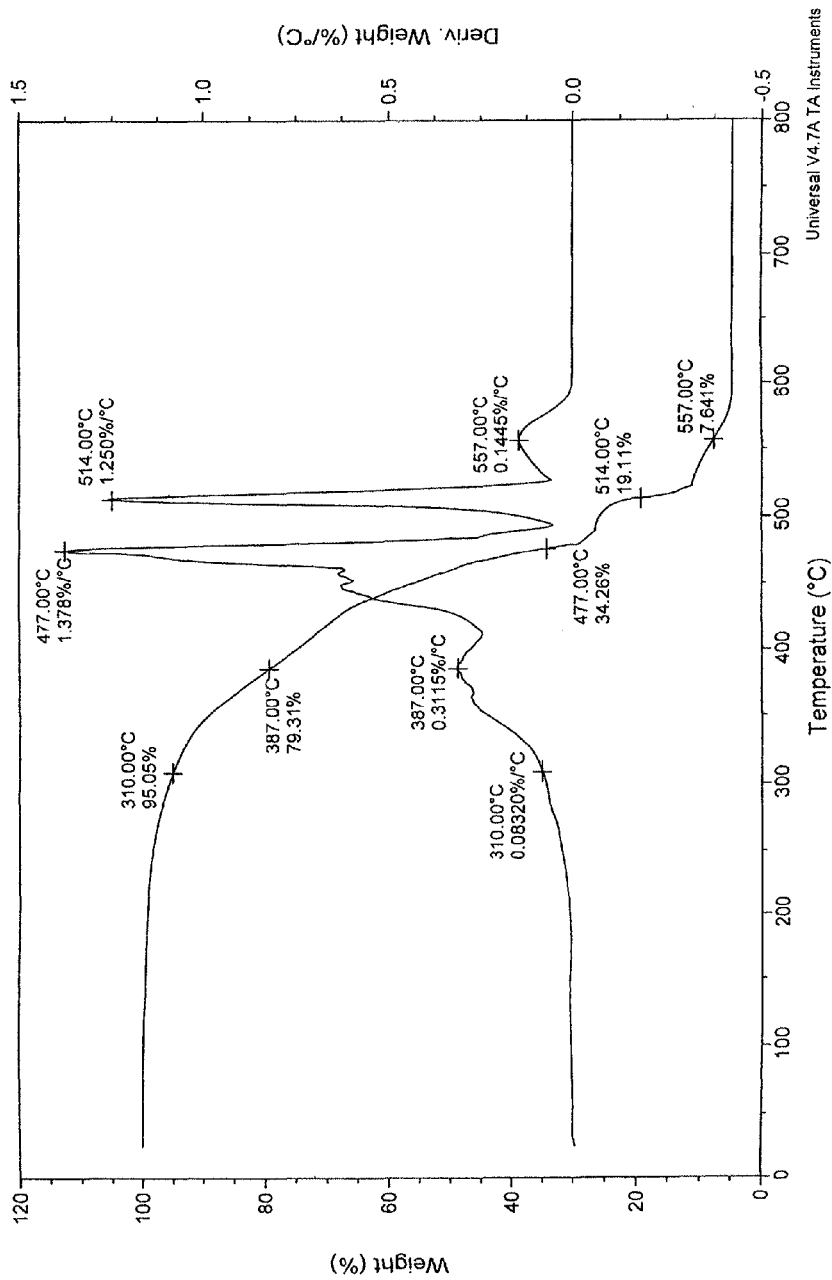
FIG. 5 shows a TGA scan result of a GTR-LLDPE-EVA-SBS blend used in accordance with a preferred embodiment of the present invention.

TGA of composition D (GTR+polymers) shown in FIG. 5 indicates the initiation of decomposition at 310° C., the maximum changes at 477° C. and 514° C.

Figure 6:
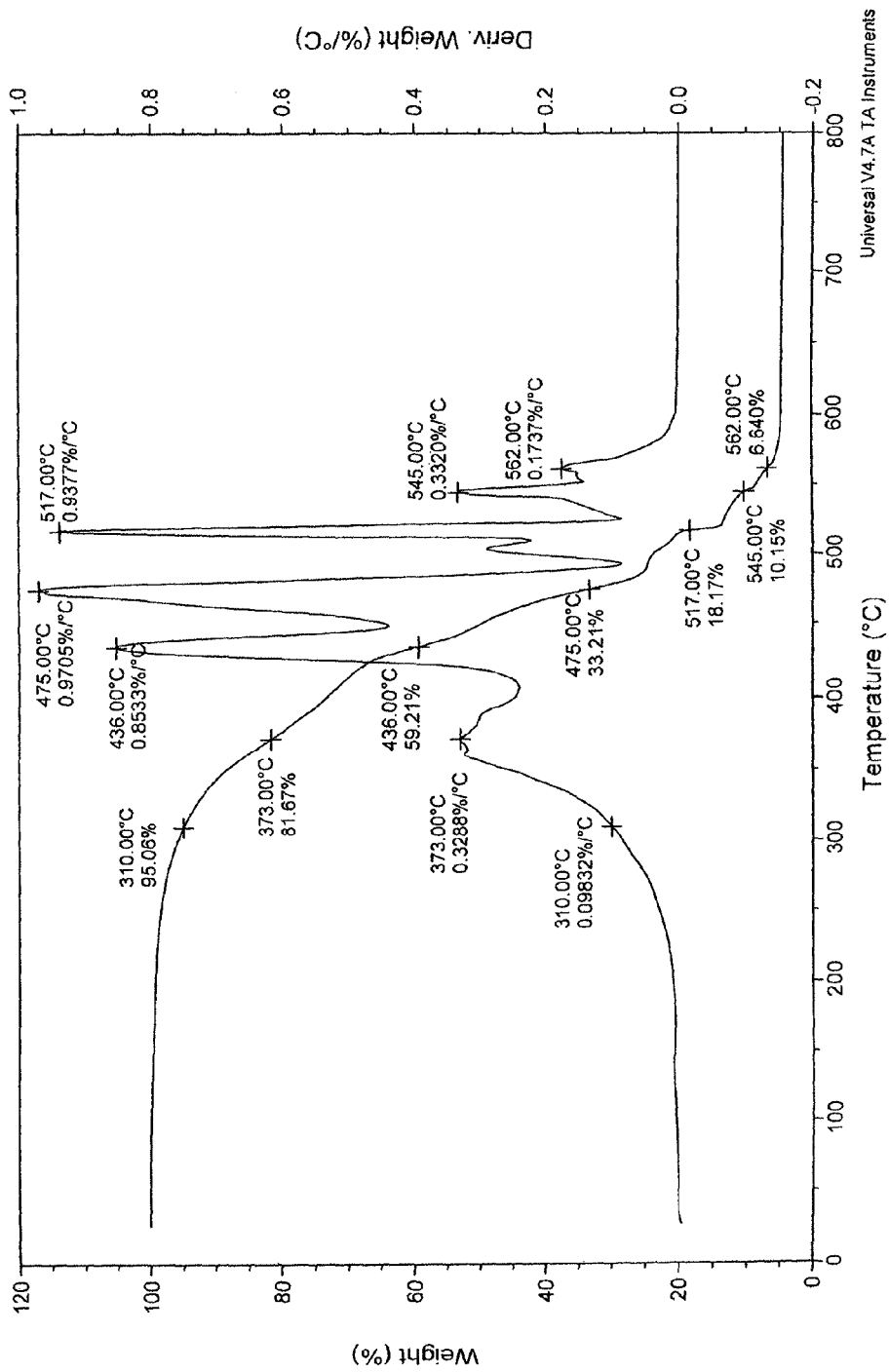
FIG. 6 presents a TGA scan result of a GTR-LLDPE-EVA-SBS and oil blend used in accordance with a preferred embodiment of the present invention.

TGA of composition E (GTR+polymers+oil) as shown in FIG. 6 indicates the initiation of decomposition is 310° C., the maximum changes at 435° C., 475° C. and 517° C. Oil addition does not influence the decomposition initiation.

The lower temperature peak mass loss can correspond to loss of low molar mass additives as well as to facile cracking of the rubber polymer and additives. The higher temperature peak in mass loss corresponds to cracking of the rubber polymer backbone. Thermal cracking reactions involving the production of gas and a decrease in crumb mass constitute reactions that degrade the rubber polymer by shortening the polymer chain length or otherwise altering the chemical structure, processes that are undesirable. Temperature was continuously increased during the TGA analysis and thermal reactions also may have occurred at lower temperature but they are relatively slow so that they were not observable within the accuracy of the measurements. In view of the forgoing, it is preferred that the de-linking reaction in accordance with the invention be restricted to a maximum temperature in the order of 250° C. and reaction times should be as short as possible (typically less than 90 minutes).

Figure 7:
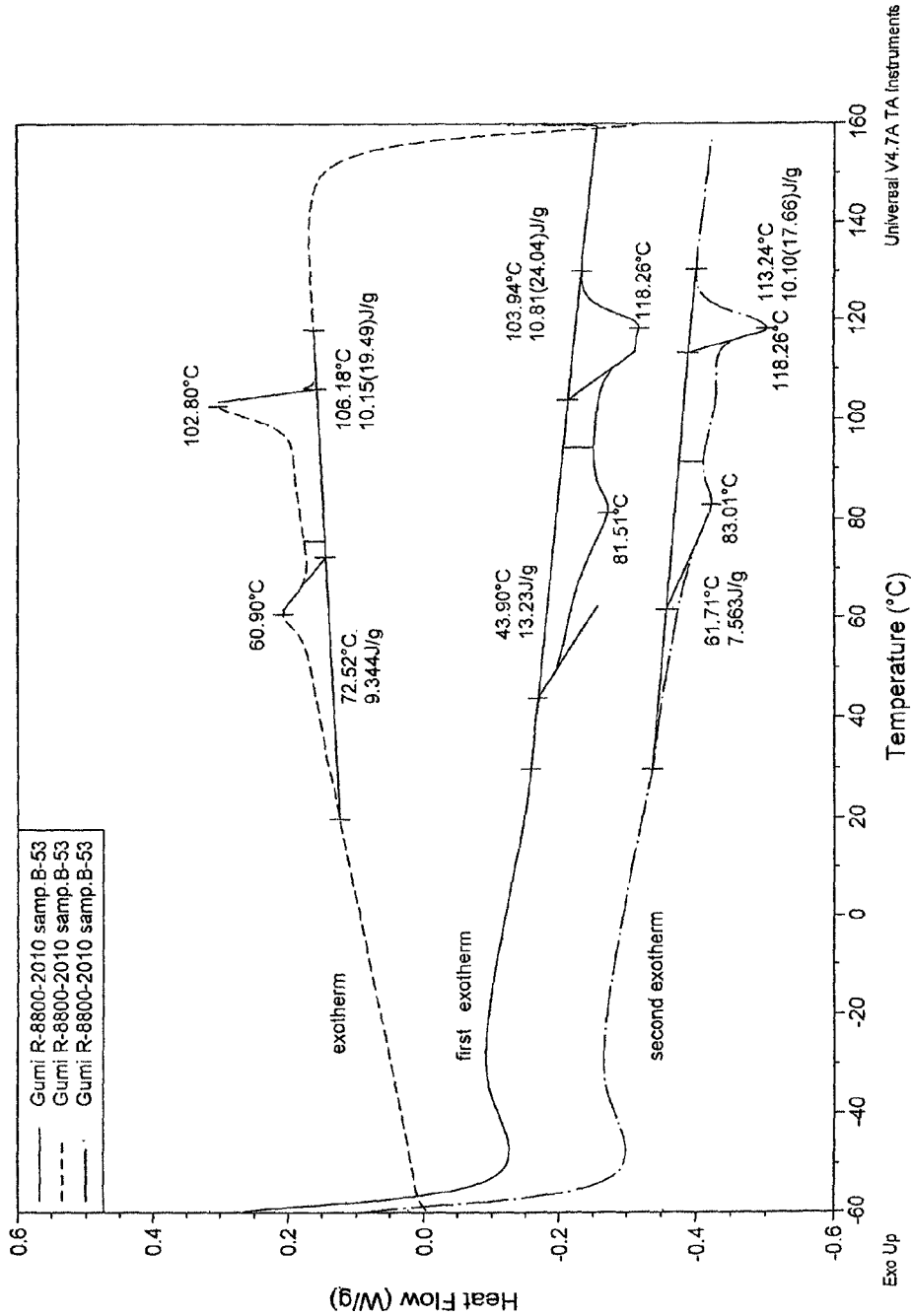
FIG. 7 presents a DSC scan result of a GTR-LLDPE-EVA-SBS and oil blend used in accordance with a preferred embodiment of the present invention

The upper service temperature (UST) determined by DSC of composition E (GTR+polymers+oil) as shown in FIG. 7 indicates the initiation of melting is 81° C. Resistance to compression set (CS) was determined at 70° C.

Example 3

The samples that were subjected to dynamic de-linking of crumb surface were processed as described above using blocking agents for sulfur radicals on GTR surface with an organic acid or anhydride. The procedure of Example 1 was followed except the composition was as indicated in Table 4 below.

TABLE 4

Effect of acids (blocking agents) on TPE properties

|  | 1 | 2 | 3 | 4 | 5 | 6 |
|---|---|---|---|---|---|---|
| GTR | 25 | 25 | 25 | 25 | 25 | 25 |
| LLDPE-1 | 7.5 | 7.5 | 7.5 | 7.5 | 7.5 | 7.5 |
| EVA-1 | 2.5 | 2.5 | 2.5 | 2.5 | 2.5 | 2.5 |
| SBS | 2.5 | 2.5 | 2.5 | 2.5 | 2.5 | 2.5 |
| MBT | 0.25 | 0.25 | 0.25 | 0.25 | 0.25 | 0.25 |
| DOTG | 0.25 | 0.25 | 0.25 | 0.25 | 0.25 | 0.25 |
| ZBEC | 0.125 | 0.125 | 0.125 | 0.125 | 0.125 | 0.125 |
| DEG | 0.5 | 0.5 | 0.5 | 0.5 | 0.5 | 0.5 |
| HMT | 0.5 | 0.5 | 0.5 | 0.5 | 0.5 | 0.5 |
| Oleic acid |  | 0.5 |  |  |  |  |
| DBSA |  |  | 0.5 |  |  |  |
| Stearic acid |  |  |  | 0.5 |  |  |
| Tall oil |  |  |  |  | 1 |  |
| APP |  |  |  |  |  | 0.5 |
| Modulus100%, MPa | 2.9 | 4 | 2.9 | 3.5 | 4.1 | 3.1 |
| Modulus 200%, MPa | 4.2 | 6 | 4.9 | 5.2 | 6 | 4.5 |
| Tensile, MPa | 5.7 | 8.1 | 6.7 | 7.4 | 7.7 | 7.5 |
| Elongation, % | 308 | 305 | 308 | 312 | 283 | 314 |
| CS 70° C./22 hr, % | 52 | 43 | 42 | 41 | 38 | 43 |

The data reported in Table 4 shows that the thermoplastic elastomeric material according to the present invention has, with respect to the comparative composition comprising a vulcanized rubber in a subdivided form devoid of the acid, improved mechanical properties, in particular stress at break and elongation at break and improved compression set resistance.

Example 4

The samples that were subjected to dynamic de-linking were processed as described above using diols, polyatomic alcohols, polyalkene oxide as the disproportioning agents or preventing reattachment of sulfur radicals.

The procedure of Example 1 was followed except the composition was as indicated in Table 5 below. For testing purposes, plaques were molded from the blended composition, and were tested and values obtained in accordance with the procedures indicated in Table 5 below.

TABLE 5

Effect of Disproportioning agents on TPE properties

|  | 7 | 8 | 9 | 10 | 11 | 12 | 13 |
|---|---|---|---|---|---|---|---|
| GTR | 25 | 25 | 25 | 25 | 25 | 25 | 25 |
| LLDPE-1 | 7.5 | 7.5 | 7.5 | 7.5 | 7.5 | 7.5 | 7.5 |
| EVA-2 | 2.5 | 2.5 | 2.5 | 2.5 | 2.5 | 2.5 | 2.5 |

TABLE 5-continued

Effect of Disproportioning agents on TPE properties

|  | 7 | 8 | 9 | 10 | 11 | 12 | 13 |
|---|---|---|---|---|---|---|---|
| SBS | 2.5 | 2.5 | 2.5 | 2.5 | 2.5 | 2.5 | 2.5 |
| MBT | 0.25 | 0.25 | 0.25 | 0.25 | 0.25 | 0.25 | 0.25 |
| DOTG | 0.25 | 0.25 | 0.25 | 0.25 | 0.25 | 0.25 | 0.25 |
| ZBEC | 0.125 | 0.125 | 0.125 | 0.125 | 0.125 | 0.125 | 0.125 |
| DEG | 0.5 | 0.5 | 0.5 | 0.5 | 0.5 | 0.5 | 0.5 |
| HMMM | 0.5 | 0.5 | 0.5 | 0.5 | 0.5 | 0.5 | 0.5 |
| Iron (III) oxide | 0.25 | 0.25 | 0.25 | 0.25 | 0.25 | 0.25 | 0.25 |
| Tall oil | 0.5 | 0.5 | 0.5 | 0.5 | 0.5 | 0.5 | 0.5 |
| Diethylene glycol |  | 0.25 | 0.5 |  |  |  |  |
| Glycerol |  |  |  | 0.5 |  |  |  |
| Pentaerythritol |  |  |  |  | 0.5 |  |  |
| Triethanolamine |  |  |  |  |  | 0.5 |  |
| Resorcinol |  |  |  |  |  |  | 0.5 |
| Modulus 100%, MPa | 3.3 | 3.6 | 3.3 | 3.3 | 3.5 | 2.9 | 3.2 |
| Modulus 200%, MPa |  | 4.9 | 4.9 |  | 4.7 | 3.6 | 4.8 |
| Tensile, MPa | 4.7 | 5 | 5.2 | 4.9 | 5.1 | 4.1 | 5.2 |
| Elongation, % | 191 | 198 | 211 | 192 | 207 | 202 | 204 |
| CS 70° C./22 hr, % | 49 | 43 | 43 | 35 | 38 | 44 | 42 |

The data reported in Table 5 shows that the thermoplastic elastomers according to the present invention has, with respect to the comparative composition comprising a vulcanized rubber in a subdivided form improved mechanical properties (compression set).

Example 5

The samples that were subjected to dynamic re-linking of crumb surface were processed as described below. Re-activation of passivated sulfur and interaction of GTR de-linked surface with free-radical-donor groups as polyamines and methylated melamine formaldehyde resin are carried out at a mixing temperature that is above the melting point range of the polyolefin matrix.

The procedure of Example 4 was followed except that the composition was as indicated in Table 6 below.

TABLE 6

Effect of free-radical donors (polyamines and melamines) on TPE properties

|  | 14 | 15 | 16 | 17 | 18 |
|---|---|---|---|---|---|
| GTR | 25 | 25 | 25 | 25 | 25 |
| LLDPE-2 | 7.5 | 7.5 | 7.5 | 7.5 | 7.5 |
| EVA-1 | 2.5 | 2.5 | 2.5 | 2.5 | 2.5 |
| SBS | 2.5 | 2.5 | 2.5 | 2.5 | 2.5 |
| MBT | 0.125 | 0.125 | 0.125 | 0.125 | 0.125 |
| DOTG | 0.125 | 0.125 | 0.125 | 0.125 | 0.125 |
| ZBEC | 0.125 | 0.125 | 0.125 | 0.125 | 0.125 |
| DEG | 0.5 | 0.5 | 0.5 | 0.5 | 0.5 |
| Iron (III) oxide | 0.25 | 0.25 | 0.25 | 0.25 | 0.25 |
| Tall oil | 0.5 | 0.5 | 0.5 | 0.5 | 0.5 |
| HMMA |  | 0.5 |  |  |  |
| HMT |  |  | 0.5 |  |  |
| HMMM |  |  |  | 0.5 |  |
| Polyamide-polyamine |  |  |  |  | 0.5 |
| Modulus 100%, MPa | 3.2 | 4 | 3.8 | 3.7 | 3.6 |
| Modulus 200%, MPa | 4.4 | 6 | 5.6 | 5.5 | 5.3 |
| Tensile, MPa | 6.1 | 8.1 | 7.7 | 7.9 | 7.4 |
| Elongation, % | 253 | 305 | 298 | 303 | 291 |
| CS 70° C./22 hr, % | 44 | 38 | 37 | 37 | 37 |

The product had physical properties at least equivalent to those of the product of Examples 2 and 3.

Comparative Testing

In order to illustrate the combined effect of the vinylpolymer (ethylenevinyl acetate copolymer) and uncured rubber (styrene-butadiene-styrene block copolymer) on the compositions of the invention. The compositions, and the tensile strength, elongation, tear strength, hardness and viscosity values are given in Table 7 below.

TABLE 7

Comparison of Properties Thermoplastic Elastomer (dynamically vulcanized EPDM in PP matrix) and inventive Olefinic Thermoplastic Elastomer

|  | Commercial TPE (Dynamically cured EPDM in PP matrix) | TPE-GTR according to the invention |
|---|---|---|
| Shore A | 82 | 83 |
| Modulus 100%, MPa | 4.1 | 4.3 |
| Modulus 200%, MPa | 6.2 | 6.3 |
| Tensile, MPa | 8.2 | 8.4 |
| Elongation, % | 346 | 296 |
| CS 70° C./22 hr, % | 36 | 37 |

Commercial TPE is Forprene 80 (EPDM + PP + phenolic resin)

The examples described above present various selected embodiments. It is noted that further embodiments are anticipated which also fall within the scope of the present invention. The scope of the present invention is defined by the claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. An Olefinic Thermoplastic Elastomer composition comprising:
   ground tire rubber (GTR) sub-divided into crumbs;
   at least one polyolefin;
   at least one styrene block copolymer;
   at least one α-olefin-vinyl ester copolymer;
   at least one sulfur scavenger;
   at least one blocking agent;
   at least one disproportioning agent;
   at least one free-radical donor acceptor; and
   a deflocculant, wherein the deflocculant allows improved dispersion and integration of the crumbs into the thermoplastic phase comprising the at least one polyolefin and wherein the deflocculant is a reactive polyamide resin based on dimerized fatty acid and polyamines that have amine values between 230 and 400.

2. The Olefinic Thermoplastic Elastomer composition of claim 1, wherein the composition comprises about 5% to about 60% of the at least one polyolefin and the at least one polyolefin is selected from the group consisting of polyethylene copolymer, polypropylene, and mixtures thereof.

3. The Olefinic Thermoplastic Elastomer composition of claim 1, wherein the composition comprises about 2% to about 30% of the at least one α-olefin-vinyl ester copolymer and the at least one α-olefin-vinyl ester copolymer is selected from the group consisting of copolymers of acrylate, copolymers of vinyl acetate, and mixtures thereof.

4. The Olefinic Thermoplastic Elastomer composition of claim 1, wherein the composition comprises about 2% to about 30% of the at least one styrene block copolymer.

5. The Olefinic Thermoplastic Elastomer composition of claim 1, wherein the composition comprises about 5% to about 70% of said ground tire rubber.

6. The Olefinic Thermoplastic Elastomer composition of claim 1, wherein said at least one sulfur scavenger is selected from the group consisting of thiazols, 2-mercaptobenzothiazol, N-cyclohexyl-2-benzolhiazole sulphenamide, diphenylguanidine, diortotolueneguanidine, and mixtures thereof.

7. The Olefinic Thermoplastic Elastomer composition of claim 1, wherein the composition comprises about 0.1-5% of the at least one blocking agent and the at least one blocking agent is selected from the group consisting of organic acids, acid donors, polyacids, phthalic anhydride, ammonium polyphosphate, and mixtures thereof.

8. The Olefinic Thermoplastic Elastomer composition of claim 1, wherein the composition comprises about 0.1-8% of the at least one disproportioning agent and the at least one disproportioning agent is selected from the group consisting of polyatomic alcohols, polyalkene oxides, polyphenols, polyalkylene oxides of the general formula $X(R—O)_nH$, glycerine, pentaerithritol, resorcinol, catechol, and mixtures thereof.

9. The Olefinic Thermoplastic Elastomer composition of claim 1, wherein the composition comprises 0.3 to 5% of the at least one free-radical donor-acceptor and the at least one free-radical donor-acceptor is selected from the group consisting of methylated melamine, polyamines, dithiocarbamates, 1,3,5-Triazine-2,4,6-triamine-formaldehyde polymer, hexamethylenetetramine, hexamethoxymethylmelamine, hexaethoxymethylmelamine, N,N'-ethylene-bismaleimides, reactive polyamide resin based on dimerized fatty acid and polyamines, zinc dimethyldithiocarbamate, zinc diethyldithiocarbamate, zinc dipropyldithiocarbamate, zinc dibutyldithiocarbamate, zinc dibenzyldithiocarbamate, zinc dibutyldithiophosphate, and mixtures thereof.

10. The Olefinic Thermoplastic Elastomer composition of claim 1, wherein said ground tire rubber is obtained from articles selected from the group consisting of scrap tires, retreaded tire buffings, and tire tubes.

11. The Olefinic Thermoplastic Elastomer composition of claim 1, wherein said crumbs are sized to be up to 1 mm.

12. The Olefinic Thermoplastic Elastomer composition of claim 1, wherein said crumbs are sized to be between 125 and 425 microns.

13. The Olefinic Thermoplastic Elastomer composition of claim 1, further comprising additives selected from the group consisting of fillers, plasticizers, resins, fresh rubber, and compatibilizers.

14. The Olefinic Thermoplastic Elastomer composition of claim 1, wherein the α-olefin-vinyl ester copolymer comprises vinyl esters of aliphatic carboxylic acids having from 4 to 12 carbon atoms.

15. A product produced from the Olefinic Thermoplastic Elastomer composition of claim 1, comprising a continuous matrix wherein said sub-divided GTR crumbs are homogeneously dispersed within said matrix and wherein said sub-divided GTR crumbs have a shell and core structure and are dynamically relinked.

* * * * *